United States Patent
Banyay et al.

(10) Patent No.: US 7,915,346 B2
(45) Date of Patent: Mar. 29, 2011

(54) IMPACT MODIFIED ACRYLICS HAVING A BIMODAL DISTRIBUTION OF IMPACT MODIFIER SIZES

(75) Inventors: Harold R. Banyay, Bensalem, PA (US); Brian Edgecombe, Moorpark, CA (US)

(73) Assignee: Arkema France, Colombes (FR)

( * ) Notice: Subject to any disclaimer, the term of this patent is extended or adjusted under 35 U.S.C. 154(b) by 280 days.

(21) Appl. No.: 12/091,071

(22) PCT Filed: Sep. 28, 2006

(86) PCT No.: PCT/US2006/038165
§ 371 (c)(1), (2), (4) Date: Jun. 19, 2008

(87) PCT Pub. No.: WO2007/050230
PCT Pub. Date: May 3, 2007

(65) Prior Publication Data
US 2008/0262156 A1    Oct. 23, 2008

Related U.S. Application Data

(60) Provisional application No. 60/731,172, filed on Oct. 28, 2005.

(51) Int. Cl.
*C08L 27/12* (2006.01)
*C08L 33/02* (2006.01)
*C08L 33/04* (2006.01)
*C08L 33/18* (2006.01)
*C08L 35/02* (2006.01)

(52) U.S. Cl. ........ 525/199; 525/221; 525/222; 525/238; 525/239; 525/241

(58) Field of Classification Search .................. 525/199, 525/221, 222, 238, 239, 241
See application file for complete search history.

(56) References Cited

U.S. PATENT DOCUMENTS

| | | |
|---|---|---|
| 4,897,449 A | 1/1990 | Gaillard et al. |
| 5,367,021 A | 11/1994 | Roovers et al. |
| 5,985,997 A | 11/1999 | Bowen et al. |
| 6,323,282 B1 | 11/2001 | Demirors et al. |
| 6,441,090 B1 | 8/2002 | Demirors et al. |
| 6,660,808 B2 | 12/2003 | Kim |
| 6,884,844 B2 * | 4/2005 | Hamilton et al. ............... 525/71 |

OTHER PUBLICATIONS

Article: "Rubber Toughening of PMMA, Part II: Effect of a Twin Population of Particle Size" Polymer Engineering and Science, Feb. 1991, vol. 31, No. 4.

* cited by examiner

*Primary Examiner* — Nathan M Nutter
(74) *Attorney, Agent, or Firm* — Thomas F. Roland

(57) ABSTRACT

The invention relates to an impact modified acrylic sheet composition having a bimodal distribution of impact modifier particle sizes. The composition provides an optimal balance of impact performance and appearance after melt processing.

11 Claims, No Drawings

US 7,915,346 B2

IMPACT MODIFIED ACRYLICS HAVING A BIMODAL DISTRIBUTION OF IMPACT MODIFIER SIZES

This application claims benefit, under U.S.C. §119 or §365 of; U.S. Ser. No. 60/731,172, filed Oct.28, 2005; and PCT/U.S.2006/038165 filed Sept. 28, 2006.

FIELD OF THE INVENTION

The invention relates to an impact modified acrylic-based composition having a bimodal distribution of impact modifier particle sizes. The composition provides an optimal balance of impact performance and appearance after melt processing.

BACKGROUND OF THE INVENTION

Rubber toughened acrylic resins are widely used in applications where the beneficial properties of acrylics (clarity, weathering, etc.) are desired, but where standard unmodified acrylic resins lack the desired level of impact toughness. The usual way of toughening an acrylic resin is by incorporating impact modifier into the acrylic matrix.

Large particle size impact modifiers (>220 nm volume average particle size) generally provide good impact performance but lead to poor appearance, such as surface haze upon thermoforming (low gloss). Small particle size modifiers (<220 nm volume average particle size) provide good appearance after melt processing but do not consistently provide good impact performance.

Rubber particles with bimodal particle size distribution have been used to achieve a balance of high gloss, impact strength and stiffness in polystyrene and polypropylene polymers as described in U.S. Pat. Nos. 5,985,997; 6,323,282; and 6,6660,808. These references describe the use of bimodal diene copolymer rubbers particles. There is no mention of acrylic impact modifiers in an acrylic-based matrix material.

The blending of particle populations with different mean particle size and therefore different properties often produces a product with physical propereties that are the average—or often the worst of those of each set of particles.

Surprisingly it was found that an acrylic composition having impact modifiers with an appropriate bimodal particle size distribution provides an optimal balance of impact performance and appearance after melt processing. By replacing an amount of the small particle size impact modifiers with large impact modifiers such that the fraction of large impact modifier in the resin is maintained below 20%; both good impact and good appearance as a part is formed, and after thermoforming can be achieved. The use of impact modifiers with a bimodal particle size distribution provides a unique balance of properties that can not be achieved with either modifier alone or any mono particle size approach.

SUMMARY OF THE INVENTION

The invention relates to an impact modified acrylic composition comprising an acrylic polymer matrix and impact modifier having a bimodal mean particle size distribution.

The invention further relates to a multi-layer article comprising a substrate layer having directly adhered thereto an impact modified acrylic composition comprising an acrylic polymer matrix and impact modifier having a bimodal mean particle size distribution.

DETAILED DESCRIPTION OF THE INVENTION

The present invention relates to the use of impact modifiers having a bimodal particle size distribution to produce an optimum balance of impact strength and appearance (gloss and distinctness of image) in an acrylic-based matrix.

The acrylic-based polymer matrix of the invention includes polymers (used herein to include homo-polymers, co-polymers, and polymers formed from three of more monomers such as terpolymer) formed primarily from alkyl methacrylate and alkyl acrylate monomers, and mixtures thereof. The alkyl methacrylate monomer is preferably methyl methacrylate, which may make up from 60 to 100 weight percent of the monomer mixture. 0 to 40 weight percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methyl acrylic acid and acrylic acid can be useful for the monomer mixture. Small levels of multifunctional monomers as crosslinking agents may also be used. Suitable crosslinking monomers include but are not limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, diethyleneglycol divinyl ether, and the like. Styrenic monomers such as styrene and alpha-methyl styrene could also be incorporated into the polymer in small amounts.

The acrylic-based matrix may also consist of a blend of one or more other thermoplastic polymers with the acrylic polymer(s). The acrylic-based matrix will comprise at least 20 percent preferably at least 40 percent, more preferably at least 50 percent, even more preferably at least 60 percent, and most preferably at least 70 percent by weight of acrylic polymer(s). Examples of other thermoplastic polymers useful in the acrylic-based matrix include but are not limited to polyvinylidene flouride (PVDF), polyvinyl chloride and chlorinated polyvinyl chloride (PVC and CPVC), polycarbonate (PC), polyvinylidene chloride and styrene/acrylonitrile (SAN).

The acrylic-based polymer matrix may include from 5 to 70 percent by weight, of one or more impact modifiers. Preferred impact modifiers are core-shell multi-layer polymers and block copolymers having at least one hard and at least one soft block. The core-shell (multi-layer) impact modifiers could have a soft (rubber or elastomeric) core and a hard shell; a hard core covered with a soft elastomeric-layer, and a hard shell; of other core-shell morphology known in the art. The rubber layers are composed of low glass transition (Tg) polymers, including, but not limited to, butyl acrylate (BA), ethylhexyl acrylate (EHA), butadiene (BD), BD/styrene, butylacrylate/styrene, and many other combinations.

The impact modifiers useful in the invention have a bimodal particle size distribution. There is no limitation on how the bimodal distribution is obtained. The particles of each "mode" particle size can be of the same or different chemical composition. In one embodiment two different impact modifiers having two different average particles sizes are blended. The impact modifiers may be of the same or different compositions. In another embodiment, a single impact modifier is separated into different particle size ranges by a known method such as screening. Different cuts of particle size ranges are then blended back together. In still another embodiment, the bimodal distribution is obtained by a single polymerization as shown by U.S. Pat. No. 6,852,812 B2

Large particle size impact modifiers provide good impact performance but have poor appearance upon melt processing (such as thermoforming, extrusion, and injection-molding), such as high surface haze, lower gloss, and poorer distinctness-of-image. Small particle size impact modifiers provide good appearance after melt processing but do not provide good impact performance. By replacing a small amount of the small particle size impact modifiers with large impact modifiers, both good impact and good appearance after thermoforming can be achieved. The amount of the larger volume-average particle size impact modifiers is from 2 to 20, preferably from 4 to 15 percent by weight of the total weight of the acrylic resin. The total bimodal impact modifier is made up of from 20 to 80 percent by weight of the large volume-average particle size and from 20 to 80 percent by weight of the small volume-average particle size particles.

The volume-average particle size of the lower particle size mode of the impact modifiers is from 60 to 220 nm, and preferably from 100 to 200. The volume-average particle size of the higher particle size mode of the impact modifier is from 220 to 700 nm and preferably from 250 to 400 nm. Volume-average of the particle can be determined by a dynamic light scattering technique of the impact modifier particles in water or diluted latex. Those skilled in the art will understand that other techniques such as microscopy will yield slightly different average values.

In addition to impact modifiers, the acrylic matrix of the invention may contain other typical polymer additives, such as anti-oxidants, dyes, colorants, UV absorbers, lubricants and fillers.

The acrylic-based polymer matrix and impact modifiers can be blended by means known in the art. In one embodiment, the acrylic-based polymer and impact modifiers are melt compounded by extrusion, then injection molded directly into articles, or into sheets, films, profiles, or pellets that can be further processed into articles.

The impact modified composition of the present invention is especially useful for films, in-mold-decorating applications, high performance uses, capstock, and injection molded high gloss parts In one end-use a thin impact modified acrylic-based film of the invention, having a UV absorber, is applied as a protective capstock over a substrate such as an ABS to form a multi-layer composite. This can be done by a co-extrusion, by use of an adhesive, or lamination process. Other substrates may also be covered with the impact acrylic of the invention, including plastics, metal, wood, glass, and stone. The substrate could be a single layer, or could itself contain multiple layers. Preferred plastic substrates include polyacrylonitrile-butadiene-styrene, polyacrylonitrile-styrene -acrylic, polycarbonate/polyacrylonitrile-butadiene-styrene, high impact polystyrene, polyvinyl chloride, thermoplastic olefins, polyolefins, polystyrene, polystyrene-acrylonitrile, polycarbonate, polyethylene terephthalate, and glycolised polyester.

EXAMPLES

Impact modifiers of two distinct particle sizes (Modifier A and Modifier B in TABLE 1) were mixed at various ratios into a PMMA matrix with black colorant. The total weight percent of impact modifier in the acrylic-based composition was held constant at 40 percent. TABLE 2 lists the amount of total impact modifier which is Modifier A, with the remaining percent being Modifier B. The materials were melt compounded by extrusion. Then injection molded into flat plaques. The plaque samples were tested for impact resistance by an instrumented falling dart procedure, gloss as produced and gloss after thermoforming. The results are given in TABLE 2.

TABLE 1

| | Composition | Volume-Avg Particle Size (nm) |
|---|---|---|
| Modifier B | Layer 1 Core<br>Copolymer of MMA, EA, allyl methacrylate = 96/3.8/0.2<br>Layer 2<br>Copolymer of Butyl acrylate, Styrene, allyl methacrylate = 81/17/2.0<br>Layer 3<br>Copolymer of MMA, EA, allyl methacrylate = 96/3.8/0.2 | 175 |
| Modifier A | Layer 1 Core<br>Copolymer of MMA, EA, allyl methacrylate = 96/3.8/0.2<br>Layer 2<br>Copolymer of Butyl acrylate, Styrene, allyl methacrylate = 81/17/2.0<br>Layer 3<br>Copolymer of MMA, EA, allyl methacrylate = 96/3.8/0.2 | 310 |

TABLE 2

| | | | 60 degree Gloss | | Energy @ |
|---|---|---|---|---|---|
| ID | Wt. % Modifier A | Wt. % Modifier B | Before Thermoforming | After Thermoforming | Max. Load ft-lbs |
| 1 | 0 | 40 | 87.3 | 75.3 | 2.1 |
| 2 | 2 | 38 | 87.2 | 74.1 | 3.6 |
| 3 | 4 | 36 | 87.1 | 73.6 | 4.3 |
| 4 | 8 | 32 | 86.8 | 72.1 | 4.7 |
| 5 | 20 | 20 | 86.2 | 68.1 | 5.1 |
| 6 | 40 | 0 | 85.1 | 58.4 | 5.3 |

What is claimed is:

1. An impact modified acrylic composition comprising an acrylic-based polymer matrix and from 5 to 70 percent by weight based on the total composition of core-shell impact modifier having a bimodal particle size distribution, wherein said acrylic-based polymer matrix comprises 60 to 100 weight percent of methyl methacrylate monomer units, wherein the bimodal particle size distribution comprises particles of a small particle size mode having a volume-average particles size of from 60 to 200 nm, and particles of the higher particle size mode having a volume-average particle size of from 220 to 700 nm.

2. The impact modified acrylic composition of claim 1 wherein the impact modifier comprises from 20 to 80 weight percent of large particle size mode particles, and from 20 to 80 percent by weight of small particle size particles, the total being 100 percent.

3. The impact modified acrylic composition of claim 1 wherein the chemical composition of the large and small mode impact modifiers is the same.

4. The impact modified acrylic composition of claim 1 wherein the smaller mode impact modifiers have a volume-average particles size of from 50 to 220 nm, and wherein said large mode impact modifiers have a volume-average particle size of from 220 to 500 nm.

5. The impact modified acrylic composition of claim 1 further comprising at least one additive selected from the group consisting of anti-oxidants, dyes, colorants, UV absorbers, lubricants and fillers.

6. The impact modified acrylic composition of claim 1 wherein said acrylic based matrix is a blend of at least 60 percent by weight of an acrylic polymer and at least one other thermoplastic polymer.

7. The impact modified acrylic composition of claim 6 wherein said other thermoplastic polymer is selected from the group consisting of polyvinylidene fluoride, polycarbonate, polyvinyl chloride, polyvinylidene chloride, styrene/acrylonitrile (SAN) and mixtures thereof.

8. The impact modified acrylic composition of claim 1, wherein the bimodal particle size distribution comprises particles of a small particle size mode having a volume-average particles size of from 60 to 200 nm.

9. The impact modified acrylic composition of claim 1, wherein the core-shell impact modifier comprises a core and at least one shell, and wherein the core comprises a copolymer of methylmethacrylate (MMA), ethylacrylate (EA), and allyl methacrylate.

10. The impact modified acrylic composition of claim 9, wherein the core-shell impact modifier comprises a first shell comprising a copolymer of butyl acrylate (BA), styrene, and allyl methacrylate.

11. The impact modified acrylic composition of claim 10, wherein the core-shell impact modifier comprises a second shell comprising a copolymer of methylmethacrylate (MMA), ethylacrylate (EA), and allyl methacrylate.

* * * * *